(12) United States Patent
Tsumori (10) Patent No.: US 6,577,321 B2
(45) Date of Patent: Jun. 10, 2003

(54) IMAGE DISPLAY APPARATUS AND DISPLAY CONTROL METHOD

(75) Inventor: Kouki Tsumori, Tokyo (JP)

(73) Assignee: Sony Corporation, Tokyo (JP)

( * ) Notice: Subject to any disclaimer, the term of this patent is extended or adjusted under 35 U.S.C. 154(b) by 72 days.

(21) Appl. No.: 09/904,331

(22) Filed: Jul. 12, 2001

(65) Prior Publication Data

US 2002/0005860 A1 Jan. 17, 2002

(30) Foreign Application Priority Data

Jul. 13, 2000  (JP) ........................................ 2000-213155

(51) Int. Cl.$^7$ ................................................ G09G 5/34
(52) U.S. Cl. ........................ 345/684; 348/569; 345/687
(58) Field of Search ................................ 345/684, 682, 345/467, 551, 564–566, 686–687, 211–213, 168, 688; 348/550, 722, 716, 569–570; 725/37–40

(56) References Cited

U.S. PATENT DOCUMENTS

| | | | | |
|---|---|---|---|---|
| 4,746,980 A | * | 5/1988 | Petersen | ..................... 348/571 |
| 5,266,932 A | * | 11/1993 | Tokumitsu | ................... 345/686 |
| 5,715,019 A | * | 2/1998 | Yata | ........................... 348/722 |
| 5,737,036 A | * | 4/1998 | Kanai et al. | ................. 348/742 |
| 5,774,108 A | * | 6/1998 | Michiyoshi | ................. 345/467 |
| 6,166,778 A | * | 12/2000 | Yamamoto et al. | ......... 348/569 |

* cited by examiner

*Primary Examiner*—Richard Hjerpe
*Assistant Examiner*—Frances Nguyen
(74) *Attorney, Agent, or Firm*—Frommer Lawrence & Haug LLP; William S. Frommer (57) ABSTRACT

When scrolling in a vertical direction, field determining means determines whether a field currently being scanned is odd-numbered or even-numbered. Address calculating means decrements a reading address for reading image data from image data storage means in a vertical direction by a given number of lines at the start of scanning of an even-numbered field on the basis of a result of the determination when scrolling in an upward direction and increments the reading address by a given number of lines at the start of scanning of an odd-numbered field when scrolling in a downward direction. The image data storage means sequentially reads the image data for output according to the calculated address.

8 Claims, 10 Drawing Sheets

TIMING A

FIG. 4B

TIMING B

FIG. 4C

TIMING C

FIG.5

FIG.7A field-1

FIG.7B field-2

IMAGE DISPLAY APPARATUS AND DISPLAY CONTROL METHOD

BACKGROUND OF THE INVENTION

The present invention relates to an image display apparatus capable of scrolling an image displayed on a screen by an interlacing method in a vertical direction and a display control method for scrolling the image.

Among display methods of a CRT (Cathode Ray Tube), a typical monitor apparatus for display of a television image, a computer image or the like on a screen, there is an interlacing (interlaced scanning) method which first scans an electron gun over only odd-numbered scanning lines from the top to the bottom of an image receiving screen and then scans over even-numbered lines. The interlacing method is known as a method that requires only half the number of lines scanned at a time by a non-interlacing (sequential scanning) method and also is capable of reducing flicker on the screen. The interlacing method is also used as a current television broadcast standard in Japan. Recently, functions of a television receiver have been diversified, and therefore a conventional method, for example use of buttons and other mechanical switches provided on the television receiver proper and a remote controller does not suffice to set the functions. Thus, the functions are often set by menu operation, which includes selecting a setting item from a menu frame displayed on the monitor screen and inputting into a displayed setting frame.

When an OSD (On Screen Display) image such as a menu image as mentioned above is displayed on a monitor apparatus using a CRT, the OSD image to be displayed is stored in a ROM (Read Only Memory) as digital image data, which is a set of pixels divided in a vertical direction and a horizontal direction, and then the OSD image is displayed by sequentially reading the digital image data in synchronism with scanning on the image receiving screen and supplying the digital image data to a video circuit under control of a processor. When a cursor, for example, as the OSD image is scrolled in a vertical direction on the screen, an address for reading image data from the ROM is changed by an amount corresponding to one scanning line.

Figure 9:
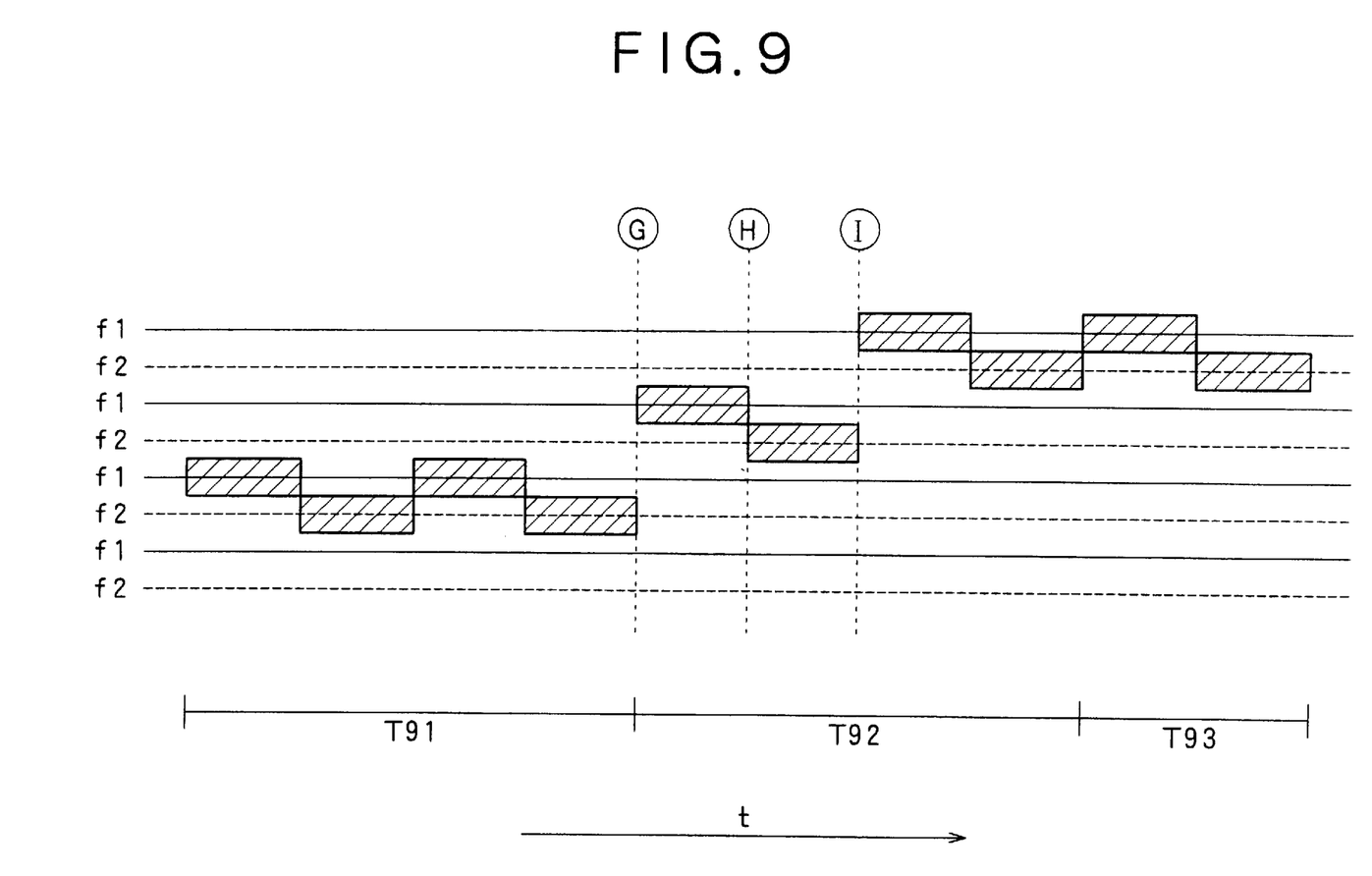
FIG. 9 shows change in the position of an OSD character being scrolled in a first conventional example.

When the image is scrolled in the vertical direction on the monitor screen employing the interlacing method, however, the image being scrolled may not appear to be moving smoothly. In the following, taking as an example an OSD character shown as a horizontal line image such as a cursor or a hyphen displayed over two scanning lines on the monitor screen employing the interlacing method, description will be made of movement of the image being scrolled. FIG. 9 shows change in the position of the OSD character being scrolled in a first conventional example.

In FIG. 9, the axis of abscissas designates passage of time t, whereas a solid line in a horizontal direction denotes a scanning line f1 in an odd-numbered field and a broken line denotes a scanning line f2 in an even-numbered field. Pixels forming the OSD character remain stationary on the screen in a time region indicated by T91, are being scrolled in an upward direction (scrolled up) in T92, and remain stationary in T93. Specifically, in timing G, the reading address of data representing the pixels of the OSD character is offset by an amount corresponding to two fields, that is, an odd-numbered field and an even-numbered field. Thus, the pixels over scanning lines f1 and f2 are both moved upward by two lines after the timing G. In timing I, the reading address is offset in the same manner, whereby the pixels are moved upward by two lines. Thus, in the timing G of offsetting the reading address in the time region T92 for scrolling up, there is a movement by three lines between the pixels in the even-numbered field f2 and the pixels in the odd-numbered field f1. In timing H, the pixels are moved by one line, whereas in the timing I, in which the reading address is offset again, the pixels are moved by three lines.

Figure 10A:
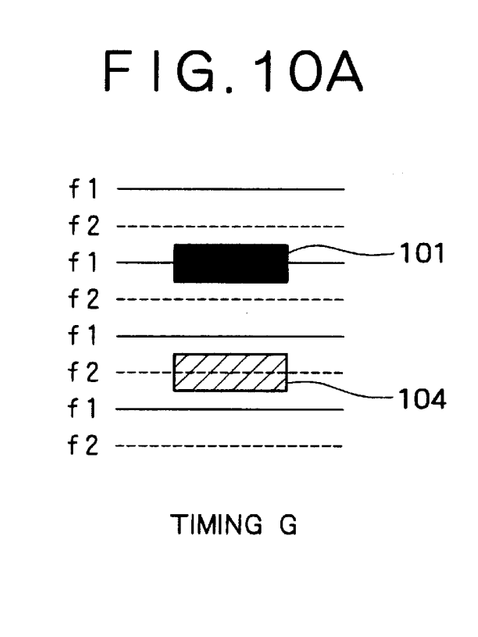
Figure 10B:
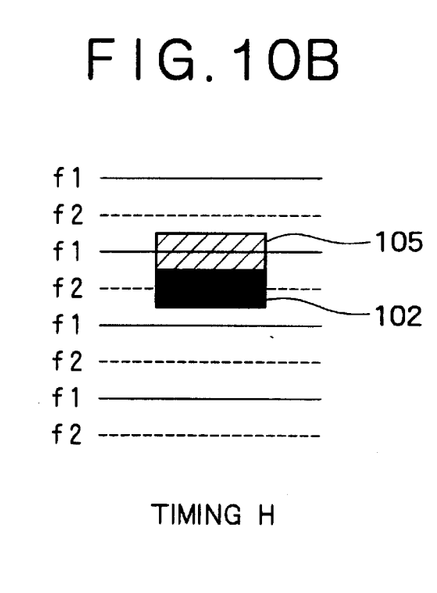
Figure 10C:
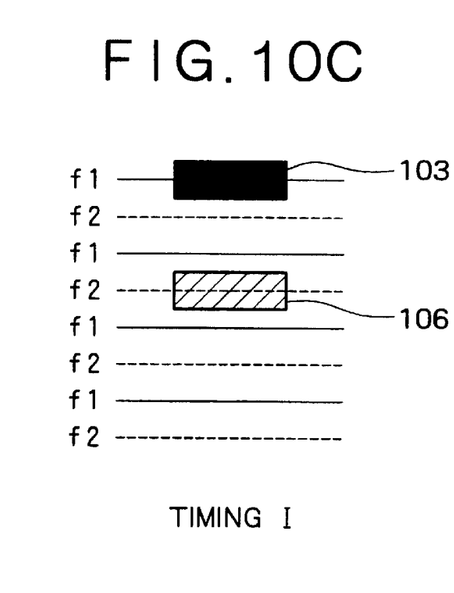

FIGS. 10A, 10B, and 10C show a displayed state of the OSD character in each of the timings in FIG. 9. FIG. 10A shows the case of the timing G; FIG. 10B shows the case of the timing H; and FIG. 10C shows the case of the timing I.

FIGS. 10A, 10B, and 10C show pixels 101, 102, and 103 being scanned in the current field in their respective timings within solidly shaded areas, and afterimages of pixels 104, 105, and 106 scanned in the previous field within diagonally shaded areas. As shown in FIGS. 10A to 10C, in conventional scrolling-up operation, when starting scrolling up the pixels during scanning of an odd-numbered field f1, or in the timing H, in which scanning is switched from the odd-numbered field f1 to an even-numbered field f2, the pixels 105 are moved to an adjacent scanning line of the pixels 102, and thus the pixels are scrolled smoothly. On the other hand, in the timing G and the timing I, in which scanning is switched from an even-numbered field f2 to an odd-numbered field f1, the pixels are moved to a position three lines away, that is, from the pixels 104 to the pixels 101 and from the pixels 106 to the pixels 103, respectively. This causes the scrolling of the display image to appear unnatural, and thus prevents smooth scrolling.

Such a problem can occur when the pixels are scrolled in a downward direction (scrolled down). This problem can occur when the pixels are scrolled down in timing in which scanning is switched from an odd-numbered field f1 to an even-numbered field f2, because in this timing, the pixels are moved to a scanning line three lines away, as described above. Therefore, the pixels are not scrolled smoothly.

SUMMARY OF THE INVENTION

The present invention has been made in view of the above problems, and it is accordingly an object of the present invention to provide an image display apparatus employing the interlacing method capable of smooth scrolling in a vertical direction.

It is another object of the present invention to provide a display control method employing the interlacing method capable of smooth scrolling in a vertical direction.

In order to solve the above problems, according to an aspect of the present invention, there is provided an image display apparatus capable of scrolling an image displayed on a screen by an interlacing method in a vertical direction, comprising: field determining means for determining whether a current field is odd-numbered or even-numbered; address calculating means for decrementing a reading address for reading image data in a vertical direction by a given number of lines at the start of scanning of an even-numbered field on the basis of a result of determining the field when scrolling the image in an upward direction and incrementing the reading address by a given number of lines at the start of scanning of an odd-numbered field when scrolling the image in a downward direction; and image data storage means for storing the image data and sequentially reading the image data according to the calculated reading address for output.

Such an image display apparatus determines whether the field currently being scanned is odd-numbered or even-numbered by the field determining means when scrolling in a vertical direction. When scrolling in an upward direction, the address calculating means decrements the address for reading image data from the image data storage means in a vertical direction by a given number of lines at the start of scanning of an even-numbered field, and then scrolling operation is performed, whereby the display pixels are moved upward by a given number of lines at the time of the scanning field switching. Similarly, when scrolling in a downward direction, the address calculating means increments the address for reading image data from the image data storage means in a vertical direction by a given number of lines at the start of scanning of an odd-numbered field, and then scrolling operation is performed, whereby the display pixels are moved downward by a given number of lines at the time of the scanning field switching.

In addition, according to another aspect of the present invention, there is provided a display control method for scrolling an image displayed on a screen by an interlacing method in a vertical direction, comprising the steps of: determining whether a current field is odd-numbered or even-numbered; decrementing a reading address for reading stored image data in a vertical direction by a given number of lines at the start of scanning of an even-numbered field on the basis of a result of determining the field when scrolling the image in an upward direction and incrementing the reading address by a given number of lines at the start of scanning of an odd-numbered field when scrolling the image in a downward direction; and sequentially reading the image data according to the calculated reading address for output.

In such a display control method, whether the field currently being scanned is odd-numbered or even-numbered is determined when scrolling in a vertical direction. When scrolling in an upward direction, the address for reading stored image data is decremented in a vertical direction by a given number of lines at the start of scanning of an even-numbered field, and then scrolling operation is performed, whereby the display pixels are moved upward by a given number of lines at the time of the scanning field switching. Similarly, when scrolling in a downward direction, the address for reading stored image data is incremented in a vertical direction by a given number of lines at the start of scanning of an odd-numbered field, and then scrolling operation is performed, whereby the display pixels are moved downward by a given number of lines at the time of the scanning field switching.

BRIEF DESCRIPTION OF THE DRAWINGS

FIG. 4B showing the case of timing B; and FIG. 4C showing the case of timing C;

FIGS. 6A, 6B, and 6C show pulse waveforms of a vertical synchronizing signal and a horizontal synchronizing signal, FIG. 6A showing the vertical synchronizing signal.

FIG. 7B showing the composite signal in the even-numbered field;

FIGS. 10A, 10B, and 10C show displayed states of the OSD character in different timings during conventional scrolling processing, FIG. 10A showing the case of timing G; FIG. 10B showing the case of timing H; and FIG. 10C showing the case of timing I.

DETAILED DESCRIPTION OF THE PREFERRD EMBODIMENTS

Preferred embodiments of the present invention will hereinafter be described with reference to the drawings.

Figure 1:
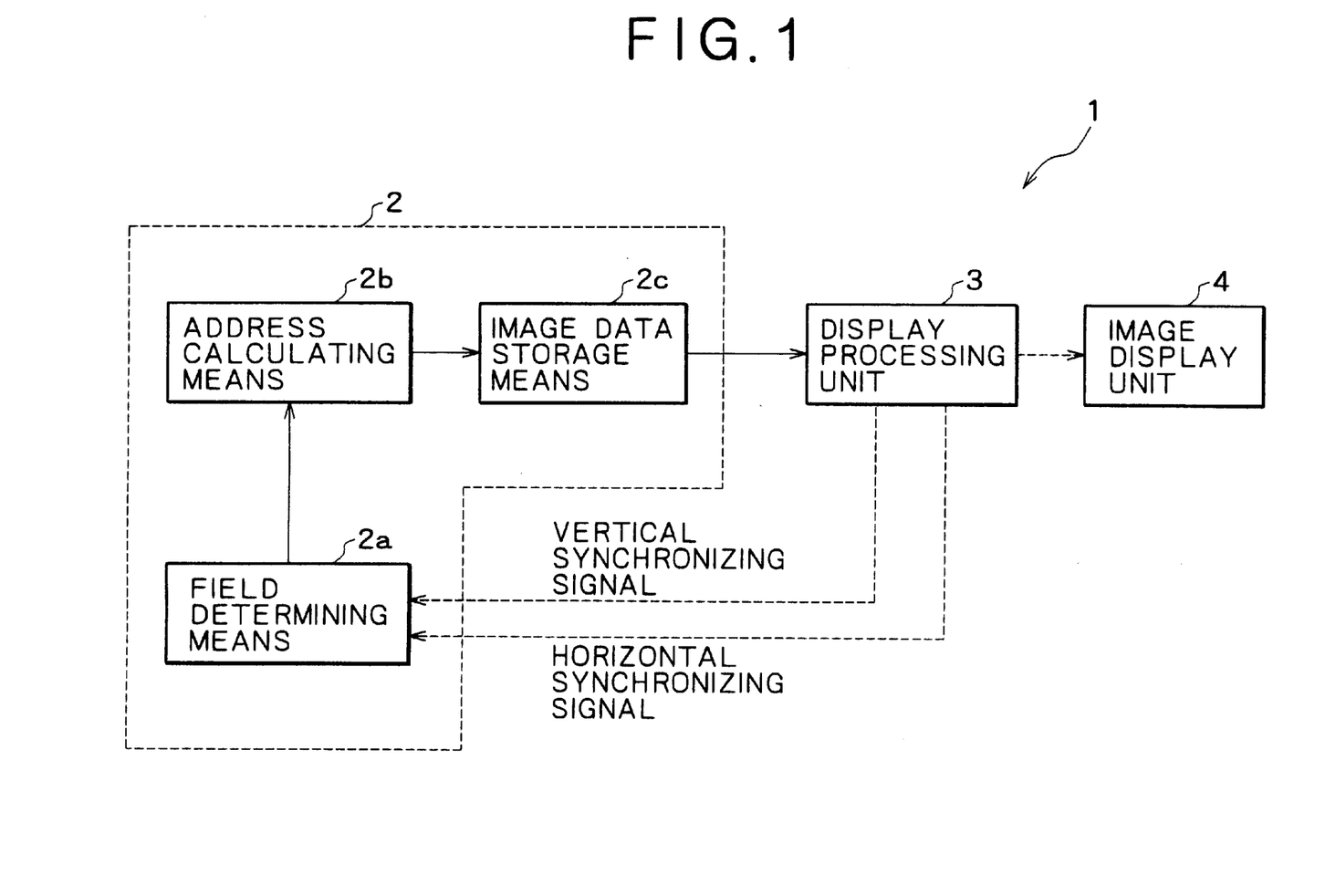
FIG. 1 shows a main configuration of an image display apparatus according to the present invention.

FIG. 1 shows a main configuration of an image display apparatus according to the present invention.

The image display apparatus 1 comprises a display control unit 2 for controlling display of an image to be displayed on a screen and scrolled in a vertical direction; a display processing unit 3 for converting data of the image data into a video signal; and an image display unit 4 for displaying the video signal. The display control unit 2 has field determining means 2a for determining whether a current field is odd-numbered or even-numbered; address calculating means 2b for calculating a reading address of image data; and image data storage means 2c for storing image data and reading image data according to the address calculated by the address calculating means 2b. The display control unit 2 is formed for example by a processor, a ROM, a RAM (Random Access Memory) and the like; the display processing unit 3 is a signal processing circuit having various ICs and the like; and the image display unit 4 is a CRT or the like.

The image display apparatus 1 is intended to display an image formed by image data stored in the image data storage means 2c on the image display unit 4 by the interlacing method. Generally, the address calculating means 2b calculates a reading address on the basis of a vertical synchronizing signal and a horizontal synchronizing signal inputted from the display processing unit 3. Then, image data at the corresponding address on the image data storage means 2c is sequentially sent to the display processing unit 3 to be converted into a video signal, and thereafter the video signal is displayed on the image display unit 4. When the image displayed on the image display unit 4 is to be scrolled in a vertical direction, the address calculated by the address calculating means 2b for reading image data from the image data storage means 2c is changed in the vertical direction, whereby a display position of the image is shifted in the vertical direction. In such scrolling in the vertical direction, the image display apparatus 1 determines whether a current field is odd-numbered or even-numbered by the field determining means 2a, and adjusts timing of changing the reading address according to the determination. The image display apparatus 1 thus achieves smooth scrolling on the screen.

For example, when scrolling up the image, the address calculating means 2b decrements the reading address on the image data storage means 2c in the vertical direction by one line, that is, changes the reading address in an upward direction by two lines in timing in which scanning of an odd-numbered field is ended and scanning of an even-numbered field is started. The reading address is not changed at the start of scanning of an odd-numbered field. When scrolling down the image, the address calculating means 2b increments the reading address on the image data storage means 2c in the vertical direction by one line, that is, changes the reading address in a downward direction by two lines in timing in which scanning of an even-numbered field is ended and scanning of an odd-numbered field is started. The reading address is not changed at the start of scanning of an even-numbered field. Such control of image data reading allows pixels displayed on a screen of the image display unit 4 to be moved stepwise by one line to an upper scanning line at all times during scrolling-up processing and moved by one line to a lower scanning line at all times during scrolling-down processing. Thus, the pixels move naturally and flicker does not occur.

The image display apparatus 1 thus judges the timing of changing the reading address by determining the field. The field determining means 2a determines the field by for example being supplied with the vertical synchronizing signal and the horizontal synchronizing signal generated by the display processing unit 3 or the like for display of image data. Alternatively, the field determining means 2a may be supplied with a composite video signal (composite signal) outputted from the image display apparatus 1 to the outside, which includes the synchronizing signals and an image data signal. When image data stored in the image data storage means 2c is displayed as an OSD image on a television image, for example, and the OSD image is scrolled, it is possible to determine the field also by using a video signal or a vertical and a horizontal synchronizing signal supplied from a television tuner to the display processing unit 3, for example. The vertical synchronizing signal is outputted each time scanning of one field is started. The horizontal synchronizing signal is in phase with a rising edge of the waveform of the vertical synchronizing signal during scanning of an odd-numbered field. The horizontal synchronizing signal is shifted in phase by a ½ cycle in an even-numbered field. The field determining means 2a can determine whether a field where scanning is started is odd-numbered or even-numbered by detecting the phase shift.

Figure 2:
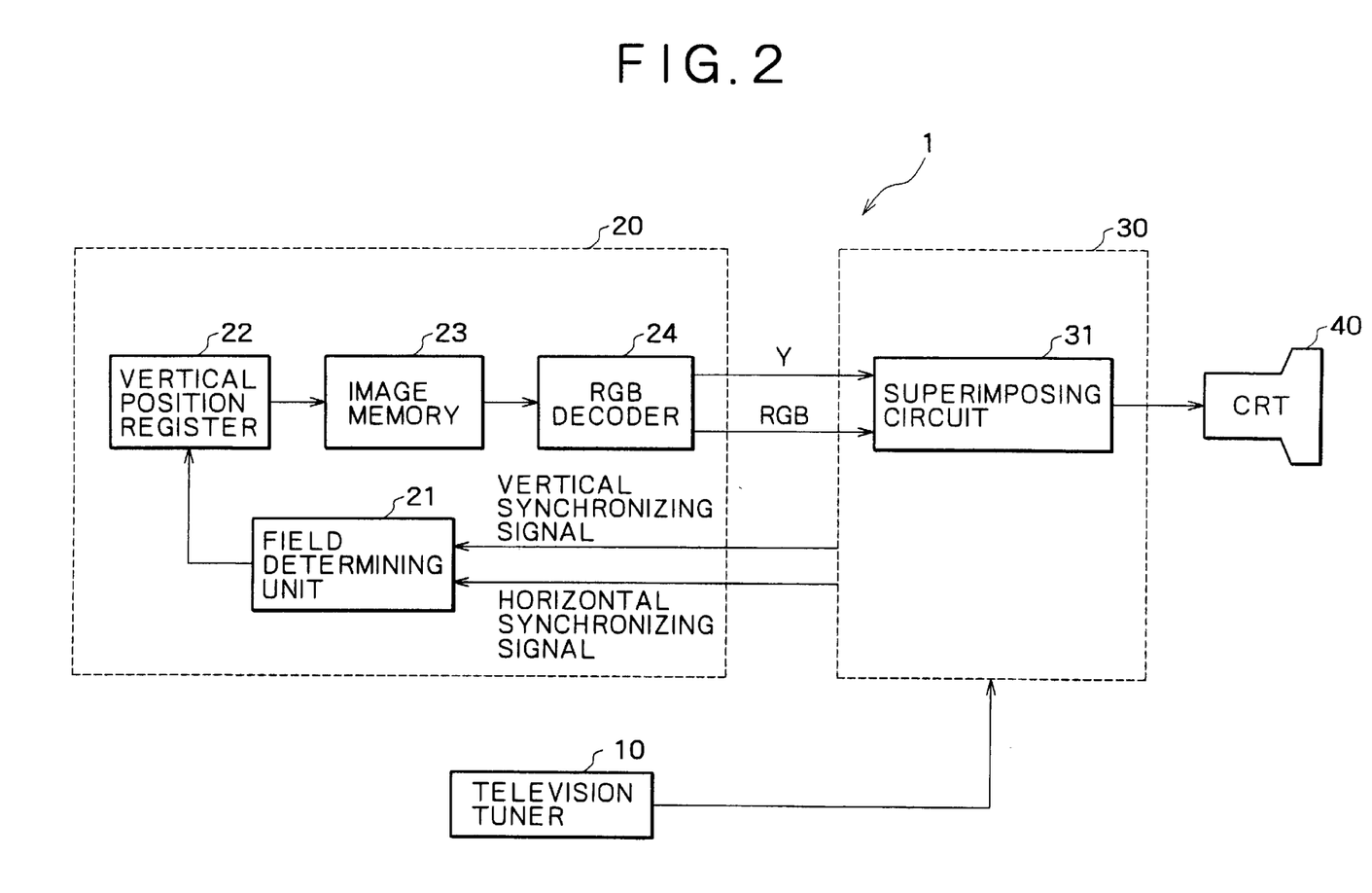
FIG. 2 schematically shows a configuration of an image display apparatus according to an embodiment of the present invention.

Next, as an embodiment of the present invention, description will be made of a case where an OSD image capable of being scrolled in a vertical direction is displayed on a television image. FIG. 2 schematically shows a configuration of an image display apparatus according to an embodiment of the present invention.

The image display apparatus 1 comprises a television tuner 10 for selecting a television broadcast signal; a microcomputer 20 for controlling output of an OSD image; a video circuit 30 for converting a signal supplied from the television tuner 10 and OSD image data into a video signal; and a CRT 40 serving as screen display means. The microcomputer 20 has a field determining unit 21 for determining whether a current field is odd-numbered or even-numbered; a vertical position register 22 for retaining a reading address specifying the position of image data in a vertical direction of the screen; an image memory 23 formed by a semiconductor ROM or the like for storing data of various OSD images; and an RGB decoder 24 for converting image data read from the image memory 23 into an RGB signal and a Y signal (luminance signal). The video circuit 30 has a superimposing circuit 31 for combining the OSD image from the microcomputer 20 with the image signal from the television tuner 10.

When the image display apparatus 1 displays a television broadcast, the television tuner 10 selects, amplifies, and demodulates a television broadcast signal received by an antenna device not shown in the figure, and then supplies the video circuit 30 with a composite signal including a luminance signal, a carrier chrominance signal, a vertical and a horizontal synchronizing signal, and a color burst. The video circuit 30 separates each of these signals from the composite video signal, and thus generates a video signal and a synchronizing signal to be sent to the CRT 40 by means of a color reproduction circuit, a synchronizing circuit and the like not shown in the figure. The CRT 40 controls an electron beam by using these signals to thereby display a television image on the image receiving screen.

On the other hand, OSD images displayed on the television image display a channel number, sound volume, and a menu and parameters of screen adjustment and other functions, for example. The OSD images are stored in the image memory 23 as a set of image data at individual pixels, and the data of the individual pixels is sequentially read by the RGB decoder 24 according to reading addresses on the image memory 23 stored in the vertical position register 22 and a horizontal position register not shown in the figure. The RGB decoder 24 converts the image data into an RGB signal and a luminance signal, and then supplies the RGB signal and the luminance signal to the superimposing circuit 31. The superimposing circuit 31 combines the supplied OSD image signals with the television image signal from the television tuner 10 by for example selecting the signals for each pixel, and then outputs the result to the CRT 40. The superimposing circuit 31 performs this processing by for example selecting and outputting the OSD image for pixels where the luminance signal supplied from the RGB decoder 24 is at a High level.

Next, when the OSD image is scrolled in a vertical direction on the screen of the CRT 40, the address for reading data of the OSD image, which address is stored in the vertical position register 22, is incremented or decremented to thereby change the display position of the OSD image in the vertical direction on the screen. In this case, the field determining unit 21 determines whether a field currently being scanned is odd-numbered or even-numbered, and judges timing of carrying out the scrolling processing according to the determination. For example, when a signal for requesting a scroll is sent from an input device not shown to the microcomputer 20, the field determining unit 21 determines the field currently being scanned, and accordingly increments or decrements the image data reading address at the start of scanning of a next specified field. When scrolling up the OSD image, a value obtained by decrementing a previous value only by one is set in the vertical position register 22 in timing in which scanning of an even-numbered field is started, and data is sequentially read from the image memory 23 according to the value. When scrolling down the OSD image, a value obtained by incrementing the previous value only by one is set in the vertical position register 22 in timing in which scanning of an odd-numbered field is started, and data is sequentially read from the image memory 23 according to the value.

Figure 3:
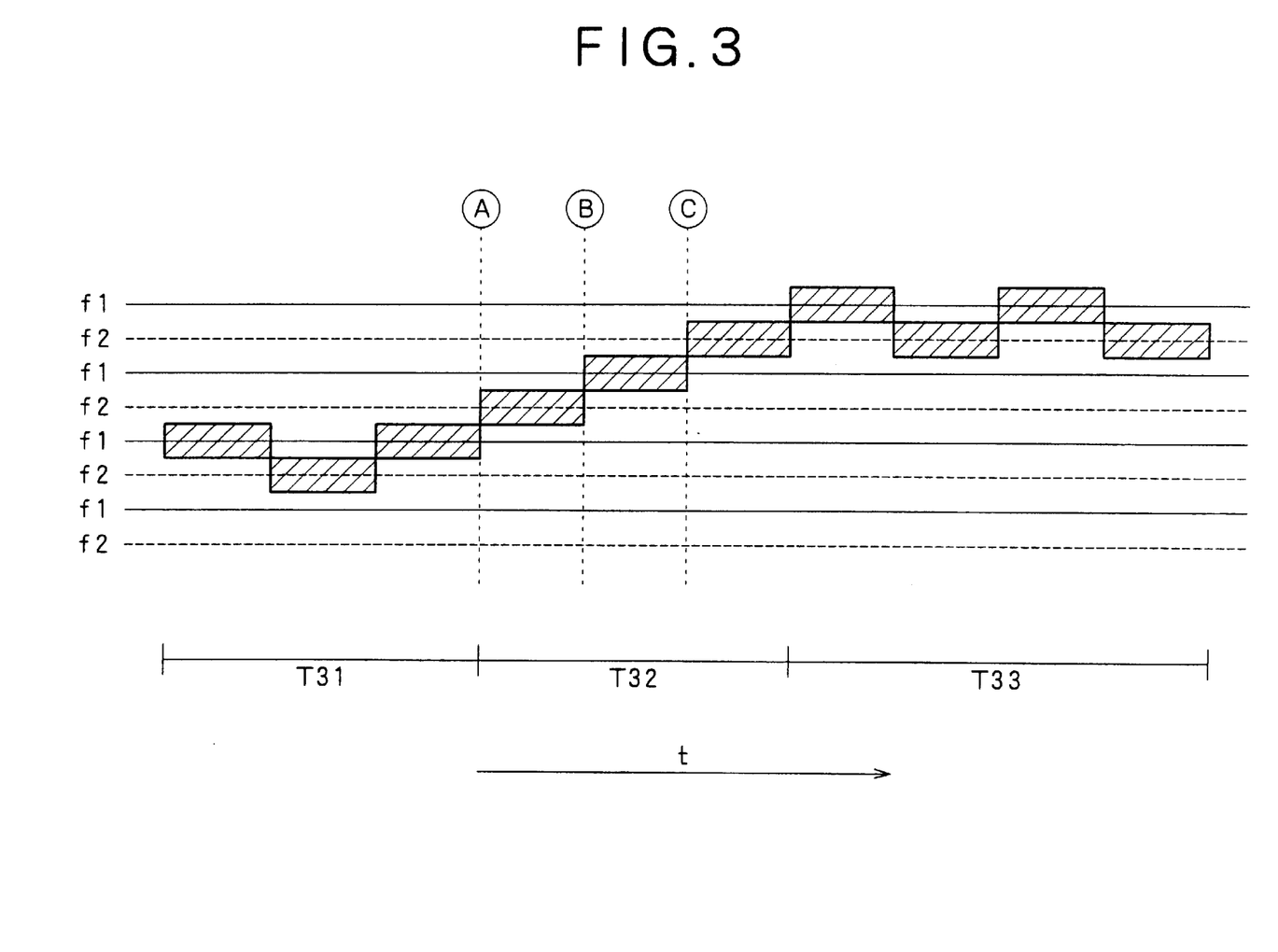
FIG. 3 shows change in the position of an OSD character being scrolled up.

Referring now to FIG. 3, FIGS. 4A to 4C, and FIG. 5, and taking as an example an OSD character shown as a horizontal line image displayed over two scanning lines such as a cursor or a hyphen, description will be made of movement of pixels when the image is scrolled in a manner as described above. First, FIG. 3 shows change in the position of the OSD character being scrolled up.

In FIG. 3, the axis of abscissas designates passage of time t, whereas a solid line in a horizontal direction denotes a scanning line f1 in an odd-numbered field and a broken line denotes a scanning line f2 in an even-numbered field. The pixels forming the OSD character remain stationary on the screen in a time region indicated by T31, are being scrolled up in T32, and remain stationary in T33. Specifically, in timing A, the scanning field is switched from an odd-numbered field f1 to an even-numbered field f2. At this point in time, the reading address of data representing the pixels of the OSD character is decreased by a decrement corresponding to one field. Thus, the pixels over scanning lines f1 and f2 are both moved upward by one line after the timing A. In timing B, the reading address is not incremented or decremented, and as a result of normal data reading operation, the pixels are moved upward by one line from the position in the even-numbered field f2 to a position in an odd-numbered field f1. In timing C, as in the timing A, the reading address is decremented, whereby the pixels are moved upward only by one line. Thus, in the timing A and the timing C of decrementing the reading address in the time region T32 for scrolling up, there is a movement by one line between the pixels in the even-numbered field f2 and the pixels in the odd-numbered field f1. Also, in the timing B, in which the reading address is not changed, the pixels are moved by the same one line.

Figure 4A:
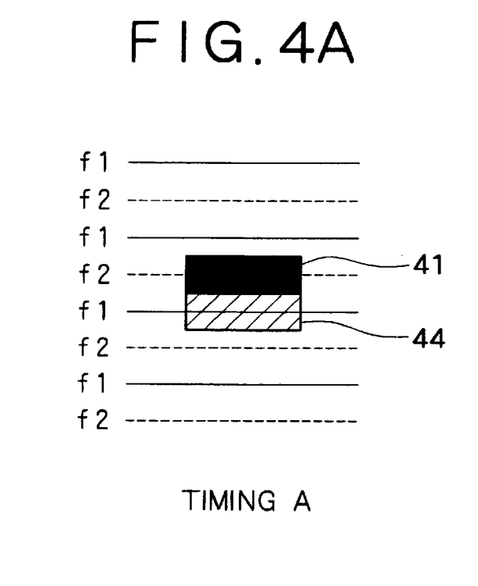
FIGS. 4A, 4B, and 4C show displayed states of the OSD character in different timings during the scrolling-up processing, FIG. 4A showing the case of timing A.
Figure 4B:
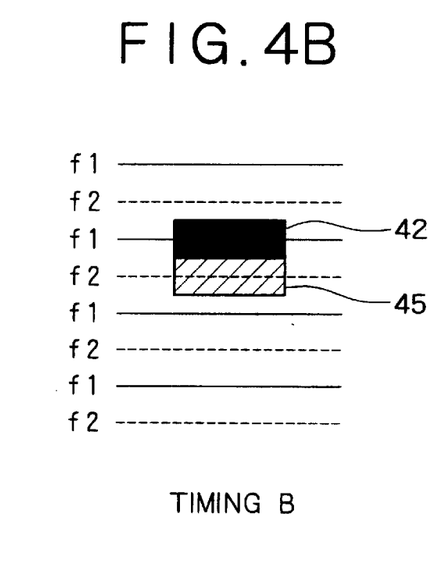
Figure 4C:
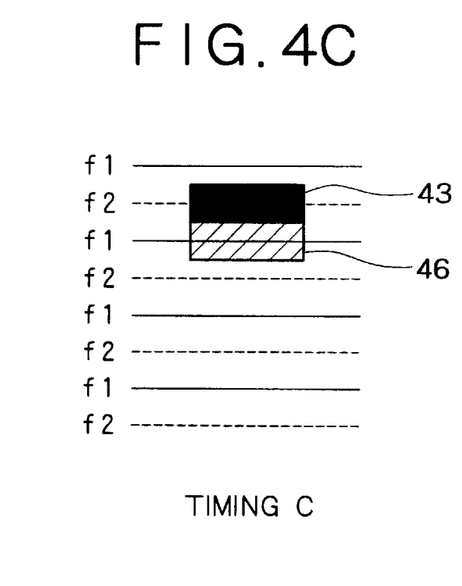

FIGS. 4A, 4B, and 4C show a displayed state of the OSD character in each of the timings in FIG. 3. FIG. 4A shows the case of the timing A; FIG. 4B shows the case of the timing B; and FIG. 4C shows the case of the timing C.

FIGS. 4A, 4B, and 4C show pixels 41, 42, and 43 being scanned in the current field in their respective timings within solidly shaded areas, and afterimages of pixels 44, 45, and 46 scanned in the previous field within diagonally shaded areas. The scrolling-up processing described above is performed when scanning of an even-numbered field f2 is started. In the timing A shown in FIG. 4A, in which timing the scrolling-up processing is started, the pixels 44 are moved to an adjacent scanning line of the pixels 41, and thus the pixels are scrolled up smoothly. Thereafter, also in the timing B shown in FIG. 4B and the timing C shown in FIG. 4c, the pixels are sequentially moved to an adjacent scanning line, that is, from the pixels 45 to the pixels 42 and from the pixels 46 to the pixels 43, respectively. Thus, when scrolling up the pixels, the reading address retained by the vertical position register 22 is decremented only by one according to the field determination by the field determining unit 21 in timing in which the scanning is switched from an odd-numbered field f1 to an even-numbered field f2, whereby the pixels are sequentially moved by one line to an upper scanning line. Therefore, flicker does not occur, and the pixels are scrolled up naturally and smoothly.

Figure 5:
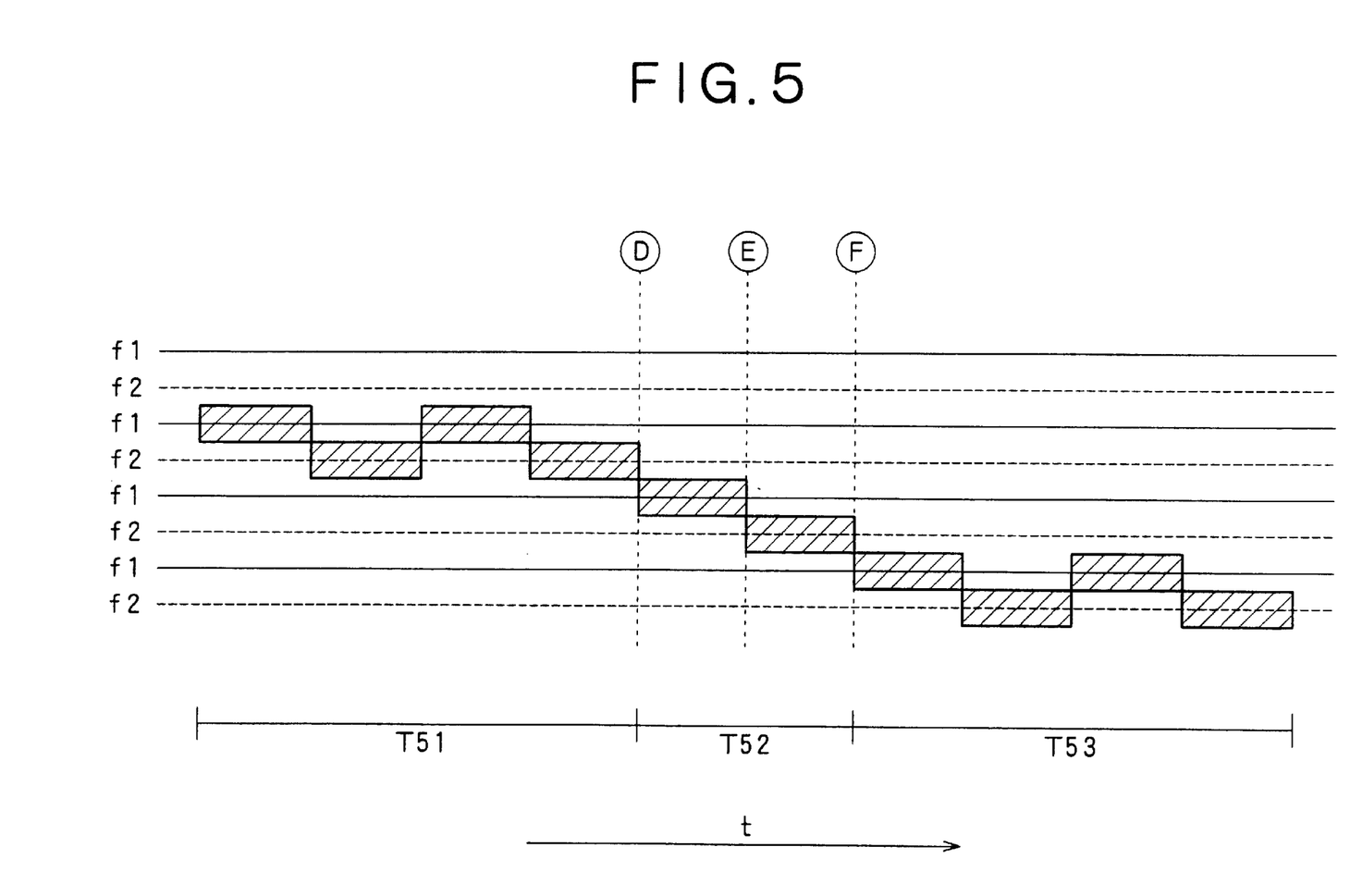
FIG. 5 shows change in the position of the OSD character being scrolled down.

FIG. 5 shows change in the position of the OSD character being scrolled down.

In FIG. 5, as in FIG. 3, the axis of abscissas designates passage of time t, whereas a solid line in a horizontal direction denotes a scanning line f1 in an odd-numbered field and a broken line denotes a scanning line f2 in an even-numbered field. The pixels forming the OSD character remain stationary on the screen in a time region indicated by T51, are being scrolled down in T52, and remain stationary in T53. Specifically, in timing D, the scanning field is switched from an even-numbered field f2 to an odd-numbered field f1. At this point in time, the reading address of data representing the pixels of the OSD character is increased by an increment corresponding to one field. Thus, the pixels over scanning lines f1 and f2 are moved downward by one line after the timing D. In timing E, the reading address is not incremented or decremented, and as a result of normal data reading operation, the pixels are moved by one line from the position in the odd-numbered field f1 to a lower position in an even-numbered field f2. In timing F, as in the timing D, the reading address is incremented, whereby the pixels are moved downward only by one line.

Thus, in the timing D and the timing F of incrementing the reading address in the time region T52 for performing the scrolling-down processing, there is a movement by one line between the pixels in the even-numbered field f2 and the pixels in the odd-numbered field f1. Also in the timing E, in which the reading address is not changed, the pixels are moved by the same one line. Thus, during the scrolling-down processing, the pixels are sequentially moved by one line to a lower scanning line. Therefore, flicker does not occur, and the pixels are scrolled down naturally and smoothly.

Figure 6A:
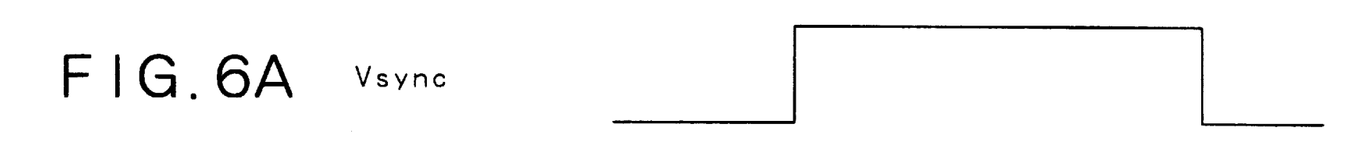
Figure 6B:
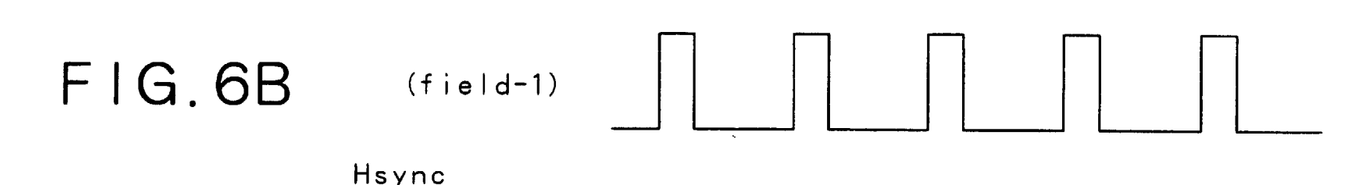
FIG. 6B showing the horizontal synchronizing signal in an odd-numbered field.
Figure 6C:
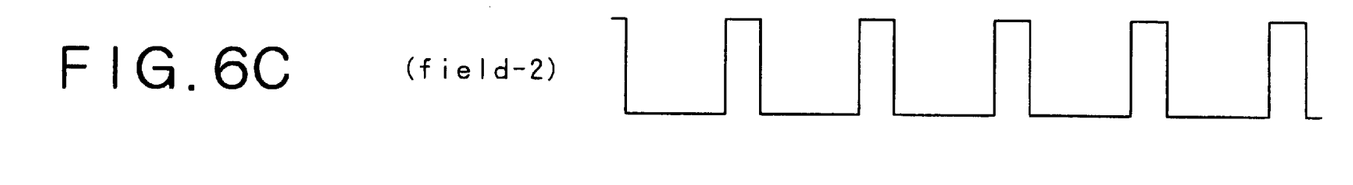
FIG. 6C showing the horizontal synchronizing signal in an even-numbered field.

The field determining method in the above scroll processing will next be described. The field determining unit 21 can determine the field from for example the vertical synchronizing signal and the horizontal synchronizing signal separated by the video circuit 30 or the composite signal supplied from the television tuner 10 to the video circuit 30, which composite signal includes a luminance signal, a carrier chrominance signal, and a vertical and a horizontal synchronizing signal. First, FIGS. 6A, 6B, and 6C show pulse waveforms of the vertical synchronizing signal and the horizontal synchronizing signal. FIG. 6A shows the vertical synchronizing signal; FIG. 6B shows the horizontal synchronizing signal in an odd-numbered field; and FIG. 6C shows the horizontal synchronizing signal in an even-numbered field.

In FIGS. 6A, 6B, and 6C, phase relation between the vertical synchronizing signal (Vsync) indicating the start of scanning of one field and the horizontal synchronizing signals (Hsync) indicating timing of display in a horizontal direction in an odd-numbered field and an even-numbered field, respectively, is shown by conceptual pulse waveforms. The synchronizing signals are separated from the composite signal supplied from the television tuner 10 and thus generated by the video circuit 30. In this case, the signals are supplied from the video circuit 30 also to the field determining unit 21 in the microcomputer 20. As shown in FIGS. 6A and 6B, the pulse of the horizontal synchronizing signal in the odd-numbered field is in phase with a rising edge of the pulse of the vertical synchronizing signal. On the other hand, the pulse of the horizontal synchronizing signal in the even-numbered field shown in FIG. 6C is shifted in phase by a ½ cycle with respect to the above pulses. Hence, it is possible for the field determining unit 21 to determine whether the field where scanning is started is odd-numbered or even-numbered by detecting such phase difference between the vertical synchronizing signal and the horizontal synchronizing signal.

Figure 7A:
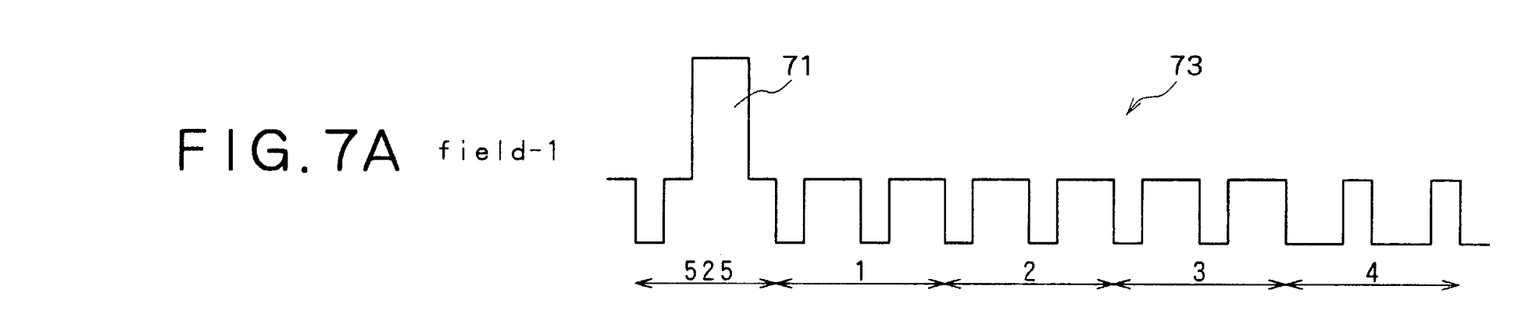
FIGS. 7A and 7B show a pulse waveform of a composite signal in an odd-numbered field and an even-numbered field, respectively, FIG. 7A showing the composite signal in the odd-numbered field.
Figure 7B:
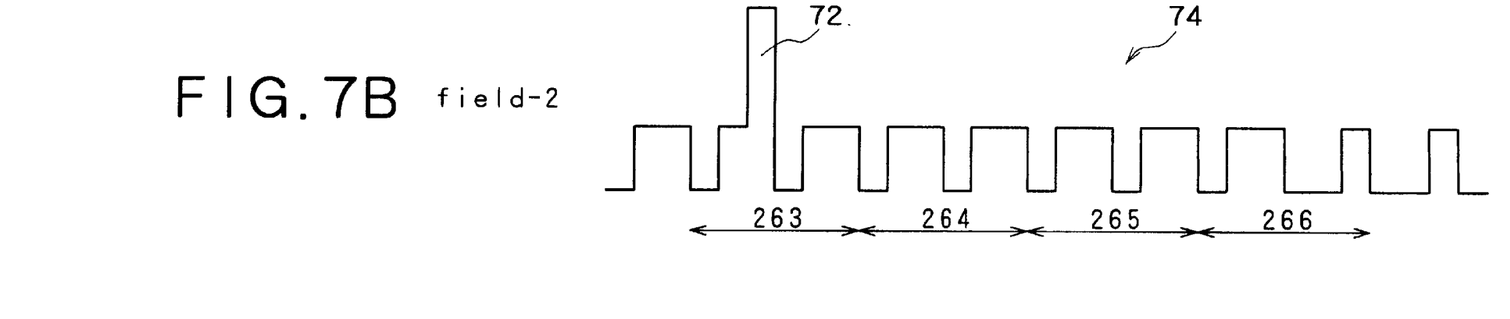

FIGS. 7A and 7B show a pulse waveform of the composite signal in an odd-numbered field and an even-numbered field, respectively. FIG. 7A shows the composite signal in an odd-numbered field; and FIG. 7B shows the composite signal in an even-numbered field.

FIGS. 7A and 7B conceptually show waveforms of the composite signals including synchronizing signals and a video signal for display on a CRT having 525 scanning lines in an odd-numbered field (field-1) and an even-numbered field (field-2). The composite signals are supplied by the television tuner 10 not only to the video circuit 30 but also to the microcomputer 20. In FIGS. 7A and 7B, pulses 71 and 72 projecting upward are video signals, and two cycles of lower pulses 73 and 74 form one cycle of the horizontal synchronizing signal. FIG. 7A shows a movement from a 525th scanning line at the bottom of the screen to a scanning line at the top of the screen, that is, the start of scanning of an odd-numbered field. FIG. 7B shows the composite signal around a 264th scanning line, where scanning of an even-numbered field is started. Three cycles of the horizontal synchronizing signal starting at the first scanning line in FIG. 7A and a ½ cycle into a 263rd scanning line in FIG. 7B form pulses equivalent to a vertical synchronizing pulse. As shown in the figures, a phase shift of a ½ cycle of the horizontal synchronizing signal occurs at a part from the 525th scanning line to the first scanning line and a part of the 263rd scanning line. Hence, it is possible for the field determining unit 21 to determine whether the field where scanning is started is odd-numbered or even-numbered by detecting such phase difference between the vertical synchronizing signal and the horizontal synchronizing signal.

It is to be noted that the field determining method is not limited to the two methods described above. While in the above methods, the signals necessary for field determination are supplied from the signal system for image display, some determining signal may be supplied from externally of the signal system, for example by detecting a scanning position on the surface of the CRT.

Figure 8:
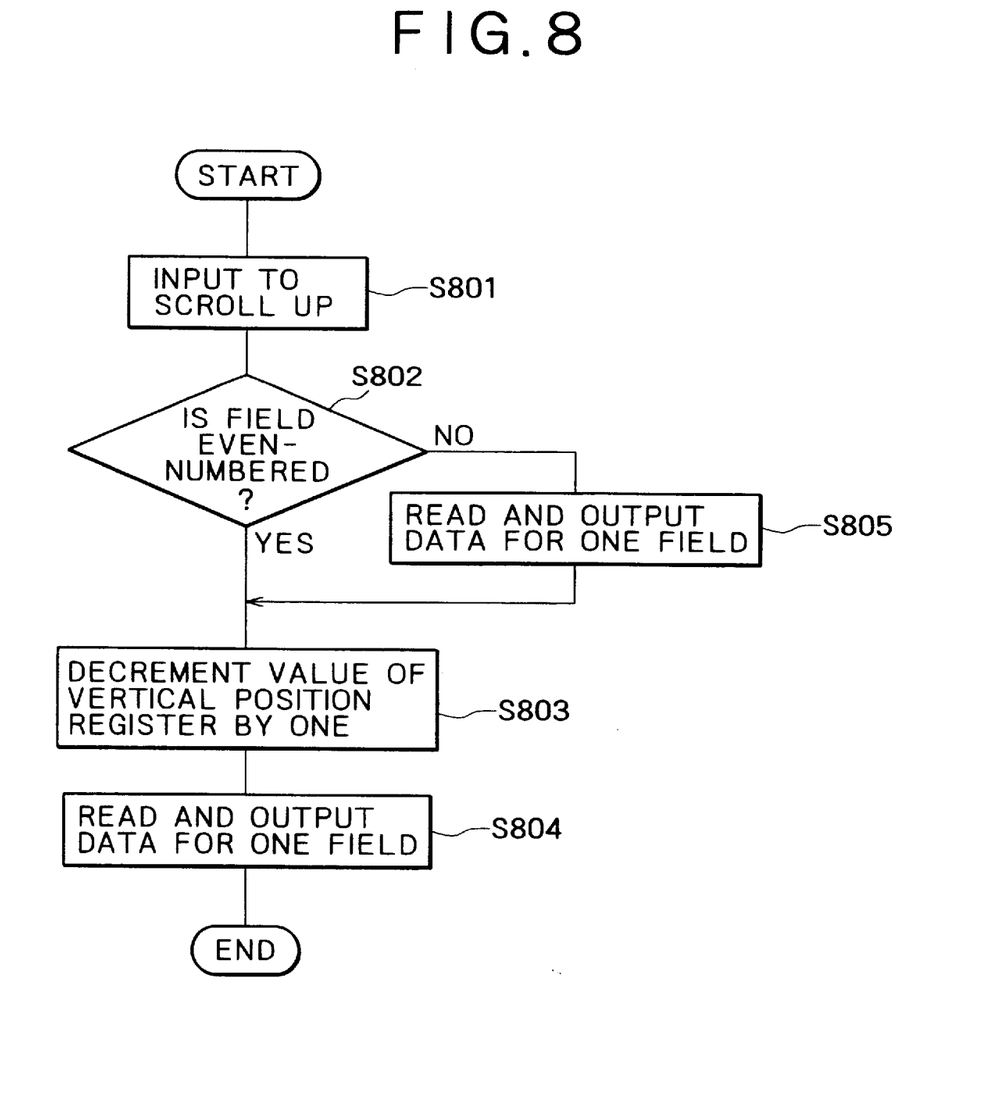
FIG. 8 is a flowchart illustrating processing of a microcomputer in scrolling operation.

Finally, FIG. 8 is a flowchart illustrating processing of the microcomputer 20 in scrolling operation. In this case, the flowchart illustrates processing in a scrolling-up operation.

When a control signal for requesting a scrolling-up is inputted to the microcomputer 20 (S801), the field determining unit 21 begins field determination processing. For example, when a vertical synchronizing signal indicating field switching is inputted to the field determining unit 21 and a start of scanning of an even-numbered field is detected from the phase of a horizontal synchronizing signal (S802), a value obtained by decrementing a previous set value by one is set in the vertical position register 22 (S803), and image data for one field is sequentially read from the image memory 23 according to the value. The RGB decoder 24 converts the image data into an RGB signal and a luminance signal, and then outputs the RGB signal and the luminance signal to the video circuit 30. Thus, at the start of scanning of the even-numbered field, the reading address on the image memory 23 is updated and changed by one line, whereby the OSD image is moved upward (S804).

On the other hand, when a start of scanning of an odd-numbered field is detected in the field determination processing at the step S802, image data for one field is sequentially read without updating the register, and then the data is outputted to the video circuit 30 via the RGB decoder 24 (S805). After this output is completed, the vertical position register is updated by setting a value obtained by decrementing its set value by one at the start of the next field (S803), and then an image is read and outputted in the same manner as described above (S804). Thus, at the start of scanning of the odd-numbered field, the reading address on the image memory 23 is not updated, whereby the OSD image is displayed without movement. At the start of scanning of the next even-numbered field, the reading address is updated, whereby the OSD image is moved upward.

As described above, the image display apparatus according to the present invention determines whether a field currently being scanned is odd-numbered or even-numbered by the field determining means when scrolling in a vertical direction. When scrolling up, the address calculating means decrements the address for reading image data from the image data storage means in a vertical direction by a given number of lines at the start of scanning of an even-numbered field, and then scrolling-up operation is performed, whereby the display pixels are moved upward by a given number of lines at the time of the scanning field switching. Similarly, when scrolling down, the address calculating means increments the address for reading image data from the image data storage means in a vertical direction by a given number of lines at the start of scanning of an odd-numbered field, and then scrolling-down operation is performed, whereby the display pixels are moved downward by a given number of lines at the time of the scanning field switching. Thus, the display pixels are moved upward or downward stepwise by a given number of lines during scrolling operation. Therefore, flicker does not occur, and the image is moved naturally and thus scrolled smoothly.

In the display control method according to the present invention, whether a field currently being scanned is odd-numbered or even-numbered is determined when scrolling in a vertical direction. When scrolling up, the address for reading stored image data is decremented in a vertical direction by a given number of lines at the start of scanning of an even-numbered field, and then scrolling-up operation is performed, whereby the display pixels are moved upward by a given number of lines at the time of the scanning field switching. Similarly, when scrolling down, the address for reading stored image data is incremented in a vertical direction by a given number of lines at the start of scanning of an odd-numbered field, and then scrolling-down operation is performed, whereby the display pixels are moved downward by a given number of lines at the time of the scanning field switching. Thus, the display pixels are moved upward or downward stepwise by a given number of lines during scrolling operation. Therefore, flicker does not occur, and the image is moved naturally and thus scrolled smoothly.

What is claimed is:

1. An image display apparatus capable of scrolling an image displayed on a screen by an interlacing method in a vertical direction, comprising:

field determining means for determining whether a current field is odd-numbered or even-numbered;

address calculating means for decrementing a reading address for reading image data in a vertical direction by a given number of lines at the start of scanning of an even-numbered field on the basis of a result of determining said field when scrolling the image in an upward direction and incrementing the reading address by a given number of lines at the start of scanning of an odd-numbered field when scrolling the image in a downward direction; and image data storage means for storing said image data and sequentially reading said image data for output according to said reading address calculated.

2. An image display apparatus as claimed in claim 1, wherein said field determining means determines whether said field is odd-numbered or even-numbered from a phase difference between a vertical synchronizing signal and a horizontal synchronizing signal.

3. An image display apparatus as claimed in claim 1, wherein said field determining means determines whether said field is odd-numbered or even-numbered from a composite signal.

4. An image display apparatus as claimed in claim 1, wherein said given number of lines is one line.

5. A display control method for scrolling an image displayed on a screen by an interlacing method in a vertical direction, comprising the steps of:

determining whether a current field is odd-numbered or even-numbered;

decrementing a reading address for reading stored image data in a vertical direction by a given number of lines at the start of scanning of an even-numbered field on the basis of a result of determining said field when scrolling the image in an upward direction and incrementing the reading address by a given number of lines at the start of scanning of an odd-numbered field when scrolling the image in a downward direction; and sequentially reading said image data for output according to said reading address calculated.

6. A display control method as claimed in claim 5, wherein whether said field is odd-numbered or even-numbered is determined from a phase difference between a vertical synchronizing signal and a horizontal synchronizing signal.

7. A display control method as claimed in claim 5, wherein whether said field is odd-numbered or even-numbered is determined from a composite signal.

8. A display control method as claimed in claim 5, wherein said given number of lines is one line.

* * * * *